Oct. 13, 1925.
G. S. LANE
1,556,614
VARIABLE CONTROL VALVE
Filed March 1, 1921
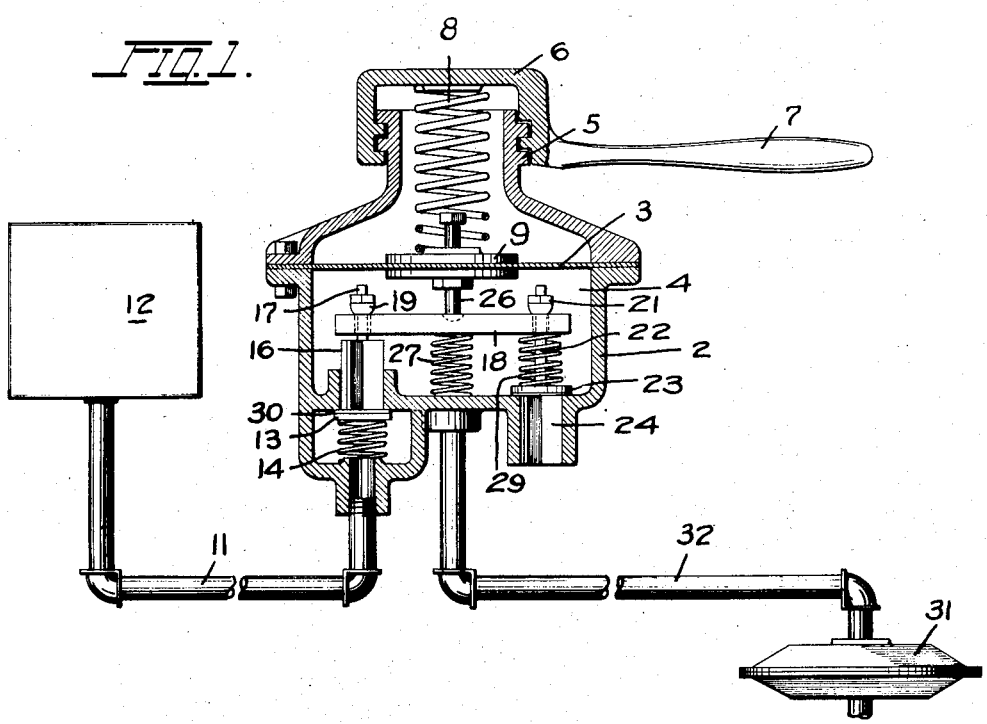
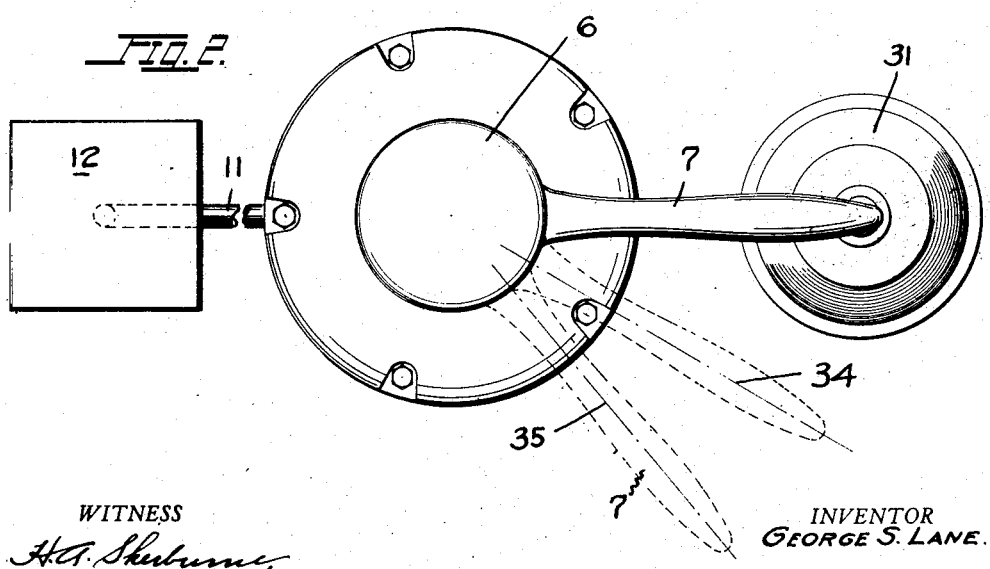
WITNESS
INVENTOR
GEORGE S. LANE.
BY
his ATTORNEYS Patented Oct. 13, 1925.

1,556,614

UNITED STATES PATENT OFFICE.

GEORGE S. LANE, OF SAN FRANCISCO, CALIFORNIA, ASSIGNOR, BY MESNE ASSIGNMENTS, TO THE WESTINGHOUSE AIR BRAKE COMPANY, OF WILMERDING, PENNSYLVANIA, A CORPORATION OF PENNSYLVANIA.

VARIABLE-CONTROL VALVE.

Application filed March 1, 1921. Serial No. 448,884.

*To all whom it may concern:*

Be it known that I, GEORGE S. LANE, a citizen of the United States, and a resident of the city and county of San Francisco and State of California, have invented a new and useful Variable-Control Valve, of which the following is a specification.

My invention relates to control valves for fluid pressure operated brakes, especially brakes upon automobile trucks.

An object of the invention is to provide a valve with which the flow of pressure fluid to the power applying means may be controlled so that a predetermined or preselected maximum pressure may gradually be accumulated in the power applying means. This maximum is manually variable up to the reservoir pressure. With a mechanism achieving this object, the setting of the brakes of the truck may be so nicely regulated that sudden seizure of the drums is eliminated, the application and release of the brakes being controlled in the exact degree required for safe and economical operation of the vehicle.

In brakes directly actuated by a hand or foot lever, a very great advantage lies in the capacity for finely graduated control of the pressure exerted upon the braked element, although the limitation imposed in the degree of pressure which it is possible to exert, is the limitation of the usefulness and applicability of such brakes. In brakes operated by fluid pressure, the flow of fluid must be interrupted and the pressure fluid partially exhausted in frequent alternations between periods of pressure and periods of exhaust, or the pressure behind the brakes quickly builds up to full reservoir pressure, which results in seizure of the wheels by the brakes, jerky control and an enormous increase in wear on all parts of the vehicle. One of the chief objects of my invention, then, is the provision of brake apparatus in which means are provided for producing gradually and then maintaining a predetermined maximum pressure in the power applying means, such maximum being determined in each braking instance by the driver's knowledge of his load and vehicle, condition of the roadway and other controlling factors. Thus the precise selection of the braking force is as wholly within the driver's control as in the case of a hand or pedal brake, but the range of pressure is far greater, being limited only by the reservoir pressure.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings, Fig. 1 is a vertical sectional view, and Fig. 2 is a plan view of my valve.

The valve of my invention comprises a casing 2 preferably formed in two parts between which a flexible diaphragm 3 is secured, forming a pressure chamber 4 in the lower part of the casing. The head of the casing is formed with threads 5 of large pitch adapted to be engaged by threads in the cap 6, so that rotary motion of the cap causes it to advance toward or recede from the diaphragm in a relatively large degree. The cap is provided with a control handle 7 for turning it readily, and a coil spring 8 is interposed between the cap and the hub 9 of the diaphragm. By rotation of the cap, therefore, the tension of the spring may be varied and the diaphragm depressed or released in varying degrees.

The casing is connected by conduit 11 with a reservoir 12 of fluid, preferably air under pressure, and an outwardly opening valve 13 is arranged to close the inlet port, a spring 14 resiliently pressing the valve on its seat. The valve comprises the head, and a 3-vane stem 16 slidably arranged in the thickened casing wall so that ample bearing is provided to prevent objectionable transverse movement of the valve. The vanes are prolonged in the stud 17 passing loosely thru an aperture in the bar 18 which extends across the casing. A spherically bottomed nut 19 threaded on the stud and bearing on the bar provides a pivotal connection between the two. The bar at its opposite end is similarly connected by nut 21 to the stud 22 extending from the head of the inwardly opening exhaust valve 23, which like the inlet valve, is formed with a 3-vane stem 24 slidably engaging in an aperture in the thickened casing wall. The two valves are spaced equally from the longitudinal axis of the casing which intersects at right angles the center of the diaphragm.

Fixed adjustably in the hub of the diaphragm and extending downwardly into the pressure chamber is a stud 26, the lower end of which is spherically formed to engage in a suitably formed cup in the center of the bar 18. A spring 27 interposed between the bar and the casing wall resiliently presses the bar against the diaphragm stud. Spring 29 is interposed between the bar 18 and the head of valve 23, the coils being so closely spaced that they close to form a stop after a very short downward movement of the bar. Preferably the valves 13 and 23 are provided with rubber gaskets 30 to prevent leakage about the valve seats. The mechanism which is operated by the pressure fluid is conveniently illustrated at 31 and is connected by conduit 32 with the pressure chamber. Such mechanism, in the instant case may be assumed to be a diaphragm cell for applying the brakes on a vehicle.

Operation: It will be understood from the foregoing, that by rotary movement of the cap by the handle 7, the spring 8 is placed under tension depressing the diaphragm and pushing down the bar 18. This resiliently presses valve 23 to its seat, and opens valve 13 as soon as the pressure on the diaphragm overbalances the pressure tending to hold the valve 13 upon its seat plus the resistance of the spring 27. With the opening of valve 13 pressure fluid fills the pressure chamber and flows to the mechanism 31. With the influx of pressure fluid into the pressure chamber, the pressure it exerts against the diaphragm tends to lift the diaphragm and stud to permit the valve 13 to close. Whether or not this occurs depends on the tension of the spring 8. Thus if the handle 7 is moved to a certain position, as for instance, that indicated by the line 34 in Fig. 2, pressure fluid will flow into the chamber and to the mechanism 31 until there is a pressure of, say, 25 pounds in the chamber. The pressure upwardly against the diaphragm overbalances the pressure of the spring 8, lifting the diaphragm and permitting the spring pressed valve 13 to close, thus preventing further increase of pressure, which in the example cited is that applied to the operation of the mechanism 31. A still greater arc of movement of the handle 7, as for example, to the line 35, Fig. 2, would cause a tension in the spring 8 which would require a diaphragm pressure of, say, 40 pounds to overcome. At this pressure, the valve 13 would again close, preventing further augmentation of the operating pressure in the pressure chamber. Thus for each position of the handle 7 there is a corresponding pressure in the pressure chamber, the pressure building up slowly to the given pressure and remaining at that point. Of course the effective pressure in the mechanism 31 corresponds to that in the valve chamber so that the mechanism is operated by a pressure gradually augmenting to a predetermined maximum, this maximum being instantly increased by further movement of the control lever, the new position determining a new maximum.

Movement of the handle 7 in the opposite direction, of course, releases the downward pressure of the spring 8 on the diaphragm and the valve 13 at once closes. The spring 27 now functions to lift the exhaust valve 23 so that the pressure fluid may escape from the pressure chamber and the mechanism 31. Such exhaustion of the pressure fluid and the lessening pressure in the mechanism 31 is within the closest control, a slight increase in the tension of spring 8 overbalancing the spring 27 and closing the exhaust valve.

If the fluid pressure operated mechanism be assumed to be a diaphragm cell for the control of brakes, it will be clear that the driver may by proper movement of the handle 7 so control the flow of pressure fluid from the reservoir to the diaphragm cell that the pressure in the cell is gradually augmented to that maximum which his judgment selects as the necessary braking power, and is then maintained at that pressure until it is desired to release the brakes. This preselected maximum is usually less than the reservoir pressure but obviously it may equal the reservoir pressure, if the control handle is moved to compress the spring 8 to such an extent that the load on the diaphragm in opposition to the pressure exerted by the pressure fluid is greater than the force tending to seat the valve 13.

I claim:

1. A variable control valve for fluid pressure operated mechanism, comprising a casing, a diaphragm forming a pressure chamber in said casing, an inlet and an exhaust valve in said casing for controlling the flow of pressure fluid into and out of said chamber, a cap threaded on said casing, a spring interposed between said cap and diaphragm, whereby rotation of the cap varies the tension of said spring, and means controlled by the diaphragm for opening and closing said inlet and exhaust valves.

2. A variable control valve for fluid pressure operated mechanism, comprising a casing, a diaphragm forming a pressure chamber in said casing, an inlet and an exhaust valve in said casing for controlling the flow of pressure fluid into and out of said chamber, means for applying a variable resilient pressure to depress said diaphragm, resiliently acting means controlled by the diaphragm for increasing the pressure of the said outlet valve on its seat when the diaphragm is depressed, and a spring tending to retain the inlet valve in closed position.

3. A variable control valve for fluid pressure operated mechanism, comprising a casing, a flexible diaphragm forming a pressure chamber in said casing, a conduit connecting said chamber with said pressure operated mechanism, a valve opened by depression of said diaphragm for controlling the admission of pressure fluid into said chamber, a spring for resiliently closing the valve, a second spring for depressing the diaphragm, means for varying the tension of said second spring, an exhaust valve in said chamber operatively connected to said diaphragm and a third spring for opening said exhaust valve when the tension of said second spring is relaxed.

4. A variable control valve for fluid pressure operated mechanism, comprising a casing, a flexible diaphragm forming a pressure chamber in said casing, an inlet valve and an exhaust valve in said casing for controlling the flow of pressure fluid into and out of said chamber and operatively connected with said diaphragm, a spring engaging the outside of said diaphragm and manually actuated means for varying the tension of said spring.

5. A variable control valve for fluid pressure operated mechanism, comprising a casing, a flexible diaphragm forming a pressure chamber in said casing, an inlet valve and an exhaust valve in said casing for controlling the flow of pressure fluid into and out of said chamber and operatively connected with said diaphragm, springs for closing the inlet valve and opening the exhaust valve, a spring engaging the outside of said diaphragm, and manually actuated means for varying the tension of the last named spring.

6. A variable control valve for fluid pressure operated mechanism, comprising a casing, a flexible diaphragm forming a pressure chamber in said casing, an inlet valve and an exhaust valve in said casing for controlling the flow of pressure fluid into and out of said chamber, means pivotally interposed between said diaphragm and said valves, a spring engaging the outside of said diaphragm, a spring engaging said pivotally interposed means in opposition to said diaphragm spring, and means for varying the tension of said diaphragm spring.

7. A variable control valve for fluid pressure operated mechanism, comprising a casing, a flexible diaphragm forming a pressure chamber in said casing, an outwardly opening inlet valve and an inwardly opening exhaust valve in said casing for controlling the flow of pressure fluid into and out of said chamber, means pivotally interposed between said diaphragm and said valves, a spring engaging the outside of said diaphragm, a spring engaging said pivotally interposed means in opposition to said diaphragm spring, and means for varying the tension of said diaphragm spring.

8. A variable control valve for fluid pressure operated mechanism, comprising a casing, a flexible diaphragm forming a pressure chamber in said casing, a spring engaging the outside of said diaphragm, a cap threaded on said casing and engaging the other end of said spring whereby rotation of the cap varies the tension of said spring, and inlet and exhaust valves in said casing for controlling the flow of pressure fluid into and out of said chamber and operatively connected with said diaphragm.

9. A variable control valve for fluid pressure operated mechanism, comprising a casing, a flexible diaphragm forming a pressure chamber in said casing, a spring engaging the outside of said diaphragm, a cap threaded on said casing and engaging the other end of said spring whereby rotation of the cap varies the tension of said spring, inlet and exhaust valves in said casing for controlling the flow of pressure fluid into and out of said chamber, means pivotally interposed between said diaphragm and said valves, and a spring engaging said interposed means in opposition to said diaphragm spring.

10. A variable control valve for fluid pressure operated mechanism, comprising a casing, a flexible diaphragm forming a pressure chamber in said casing, an outwardly opening inlet valve and an inwardly opening exhaust valve in said casing for controlling the flow of pressure fluid into and out of said chamber, a stud on said diaphragm, a bar engaged by said stud and operatively connected to both said valves, a spring engaging the outside of said diaphragm, means for varying the tension on said spring, and a spring engaging said bar in opposition to said diaphragm spring.

11. A variable control valve, for fluid pressure operated mechanism, comprising a casing, a flexible diaphragm forming a pressure chamber in said casing, an inlet valve and an exhaust valve in said casing for controlling the flow of pressure fluid into and out of said chamber, a bar to the ends of which said valves are connected, means secured to the diaphragm and engaging said bar intermediate the ends thereof, means for applying resilient pressure to depress said diaphragm and a spring engaging said bar and opposing said pressure applying means.

In testimony whereof, I have hereunto set my hand.

GEORGE S. LANE.